United States Patent
Klinner

(10) Patent No.: US 9,719,464 B2
(45) Date of Patent: Aug. 1, 2017

(54) METAL-ELASTOMER SEAL WITH INTEGRATED DIRT AND MEDIA SEALING

(71) Applicant: FEDERAL-MOGUL SEALING SYSTEMS GMBH, Herdorf (DE)

(72) Inventor: Manfred Klinner, Troisdorf (DE)

(73) Assignee: Federal-Mogul Sealing Systems GmbH, Herdorf (DE)

(*) Notice: Subject to any disclaimer, the term of this patent is extended or adjusted under 35 U.S.C. 154(b) by 0 days.

(21) Appl. No.: 14/439,983

(22) PCT Filed: Aug. 1, 2013

(86) PCT No.: PCT/EP2013/066158
§ 371 (c)(1),
(2) Date: Apr. 30, 2015

(87) PCT Pub. No.: WO2014/067680
PCT Pub. Date: May 8, 2014

(65) Prior Publication Data
US 2015/0292433 A1    Oct. 15, 2015

(30) Foreign Application Priority Data
Oct. 30, 2012   (DE) .................. 10 2012 219 808

(51) Int. Cl.
*F02F 11/00*     (2006.01)
*F16J 15/08*     (2006.01)
*F16J 15/12*     (2006.01)

(52) U.S. Cl.
CPC ......... *F02F 11/002* (2013.01); *F16J 15/0818* (2013.01); *F16J 15/0825* (2013.01);
(Continued)

(58) Field of Classification Search
CPC .................. F02F 11/002; F16J 15/0818; F16J 2015/0868; F16J 15/123; F16J 2015/0856; F16J 2015/0862; F16J 15/0825
(Continued)

(56) References Cited

U.S. PATENT DOCUMENTS 4,312,512 A * 1/1982 Conte ................. F16J 15/0825
                                                            277/593
5,439,234 A * 8/1995 Udagawa ............. F16J 15/0825
                                                            277/595
(Continued)

FOREIGN PATENT DOCUMENTS

| EP | 0853204 A1 | 7/1998 |
| EP | 2138745 A1 | 12/2009 |
| FR | 2774430 A1 | 8/1999 |

*Primary Examiner* — Nathan Cumar
(74) *Attorney, Agent, or Firm* — Robert L. Stearns; Dickinson Wright, PLLC

(57) ABSTRACT

A flat gasket has a functional layer with at least one media through-opening and at least one combustion chamber through-opening. A second layer, which is separate from the functional layer. The second layer has a media through-opening that corresponds to the media through-opening in the functional layer and a combustion chamber through-opening that corresponds to the combustion chamber through-opening in the functional layer. The functional layer has at least one combustion chamber sealing bead, which is preferably a full bead, for each combustion chamber through-opening. The second layer has an outer boundary sealing bead and an elastomer sealing profile for each media through-opening.

24 Claims, 3 Drawing Sheets

(52) U.S. Cl.
CPC ...... *F16J 15/123* (2013.01); *F16J 2015/0856* (2013.01); *F16J 2015/0862* (2013.01); *F16J 2015/0868* (2013.01)

(58) Field of Classification Search
USPC .................................................. 277/591–598
See application file for complete search history.

(56) References Cited

U.S. PATENT DOCUMENTS

| | | | | |
|---|---|---|---|---|
| 6,145,847 | A * | 11/2000 | Maeda et al. | 277/593 |
| 6,168,166 | B1 * | 1/2001 | Akimoto | F16J 15/0825 |
| | | | | 277/591 |
| 6,371,489 | B1 * | 4/2002 | Combet et al. | 277/594 |
| 6,554,286 | B1 * | 4/2003 | Tanaka | F16J 15/0818 |
| | | | | 277/591 |
| 2001/0048202 | A1 | 12/2001 | Zerfab | |
| 2002/0163139 | A1 * | 11/2002 | Poquet | F02F 7/006 |
| | | | | 277/592 |
| 2003/0085530 | A1 * | 5/2003 | Miyaoh | F16J 15/0825 |
| | | | | 277/593 |
| 2004/0160017 | A1 * | 8/2004 | Diez | F16J 15/0825 |
| | | | | 277/593 |
| 2006/0131818 | A1 * | 6/2006 | Diez | F02F 11/002 |
| | | | | 277/592 |
| 2008/0185790 | A1 * | 8/2008 | Gasch et al. | 277/595 |
| 2010/0109256 | A1 * | 5/2010 | Goettler | F16J 15/0818 |
| | | | | 277/592 |
| 2012/0161403 | A1 * | 6/2012 | Kusano | F02F 11/002 |
| | | | | 277/592 |

* cited by examiner

METAL-ELASTOMER SEAL WITH INTEGRATED DIRT AND MEDIA SEALING

BACKGROUND OF THE INVENTION

1. Technical Field

The present invention relates to an improved metallic flat gasket with elastomer sealing elements, which has integrated anti-dirt and media sealing, in particular a steel-elastomer cylinder head gasket.

2. Related Art

In such flat gaskets, such as cylinder head gaskets, different sealing tasks must be carried out. The combustion chambers must be sealed off to prevent combustion gases escaping. Furthermore, through-holes for fluids and media such as coolant and lubricant must be sealed off against the corresponding fluids. Not least, sealing at the outer boundary is necessary to prevent the ingress of dirt and spray water and condensation.

So far, gaskets have been used for this in which elastomer profiles are injection-moulded around the outside of thick plate layers in order to achieve anti-dirt sealing. Elastomer profiles are likewise used in the inner region for media such as coolant and lubricant. The gas sealing of the combustion chambers is usually done by peripheral sealing beads in the plate layer.

In these known gaskets, a corresponding amount of the elastomer material is needed for the outer boundary. Furthermore, corresponding special injection-moulding dies are needed. The conventional gasket is therefore material-and cost-intensive and requires expensive special tools.

SUMMARY OF THE INVENTION

It is therefore the object of the present invention to provide an improved gasket that is more cost-effective and is simpler to produce with at least equivalent functioning.

According to a first aspect of the invention, a flat gasket is provided, comprising:

- a functional layer having at least one media through-opening and at least one combustion chamber through-opening; and
- a second layer, which is separate from the functional layer and has a media through-opening(s) that corresponds to the media through-opening(s) in the functional layer and a combustion chamber through-opening(s) that corresponds to the combustion chamber through-opening(s) in the functional layer;
- wherein the functional layer has at least one combustion chamber sealing bead, which is preferably a full bead, for each combustion chamber through-opening; and
- wherein the second layer has an outer boundary sealing bead and an elastomer sealing profile for each media through-opening.

The object is achieved by the two-layered construction according to the invention. The elastomer profiles for the media sealing are injection-moulded onto a separate, second plate layer, and at the same time anti-dirt sealing is integrated on the outer boundary by means of a bead. The functional layer performs gas sealing of the combustion chambers by a peripheral sealing bead being provided.

In the gasket according to the invention, gas sealing is done only by means of a plate, which does not have to be a spring steel plate and can be relatively thick. Media sealing is done by means of injection-moulded elastomer bodies on a plate, which can be a thin spring steel plate, but other steel qualities are also possible. The outer boundary sealing or anti-dirt sealing is done by means of a bead, preferably a half-bead. There is therefore a division of the functions into combustion chamber or gas sealing by means of the functional layer and media and outer/anti-dirt sealing by means of the separate second or protective layer.

According to one embodiment, the functional layer and the second layer lie one above the other in the outer boundary region.

With this embodiment it is possible for example to provide the outer sealing bead in such a manner that it rests at least partially on the functional layer.

Alternatively, it is also possible to provide the functional layer and the second layer such that they do not lie one above the other in the outer boundary region. The separate second layer then preferably extends further outwards than the functional layer. In this embodiment too, both half- and full beads are possible as the outer sealing bead, the respective bead preferably being formed in the direction of the functional layer. It is then possible to isolate the functional layer completely from the outside by means of the outer sealing bead when installed.

According to one embodiment, the functional layer and the second layer lie one above the other in the inner boundary region of the combustion chamber through-opening(s).

According to one embodiment, the functional layer and the second layer lie one above the other in the inner boundary region of the media through-opening(s).

According to one embodiment, the second layer projects radially inwards over the functional layer in the region of the media through-opening(s).

In this embodiment, more space is created to arrange the media sealing elements and/or to make them wider. Wider elastomer sealing elements can offer an improved service life; for example a plurality of wave-like sealing lips can also be formed. Furthermore, the functional layer in the media through-openings can be completely isolated from the respective medium by the elastomer sealing elements for media.

According to one embodiment, at least one of the elastomer sealing profiles surrounds the inner boundary edge of the second layer of the associated media through-opening.

In this manner, the elastomer sealing faces on the top and underside of the second layer are held together well, since the elastomer material connects both faces to the inner boundary edge. Furthermore, the inner boundary edge of the relevant media opening is isolated from the medium thereby. It is also made possible for post-machining of the inner boundary edges to be omitted if the latter have still burrs etc. from punching processes, for instance.

According to one embodiment, the functional layer is a relatively thick layer and the second layer is a relatively thin layer.

According to one embodiment, the second layer has a bead around at least one media through-opening, which points in the direction of the functional layer.

The use of a corresponding bead makes it possible for the centre plane of the second layer to coincide approximately with the centre plane of the functional layer in the region of the media through-openings. This is possible either with a half-bead or alternatively with a full bead with a non-symmetrical height of the bead feet.

According to an exemplary embodiment, the functional layer has a thickness of 0.1-2 mm, more preferably 0.5-1.5 mm, most preferably approximately 0.9-1.1 mm and/or the second layer has a thickness of approximately 0.1-0.4 mm, preferably 0.1-0.3 mm. In an exemplary embodiment, the thickness of the protective layer is between 5% and 50%, more preferably between 10 and 30%, most preferably approximately 20% of the thickness of the functional layer.

According to one embodiment, the functional layer is a galvanised steel layer or a stainless steel layer and/or the second layer is a spring steel layer. Other steel qualities are also possible for the second layer, spring steel being preferred but not strictly necessary.

According to one embodiment, the functional layer has at least two combustion chamber beads per combustion chamber opening.

According to one embodiment, at least one of the elastomer sealing profiles is thickened facing the functional layer or facing away from the functional layer.

According to one embodiment, the functional layer has at least one connecting through-opening and the second layer has at least one folded-over portion, which is folded over around the inner boundary of the connecting through-opening.

According to this embodiment, one or more connecting through-openings are provided in the functional layer. The second layer can then be pushed through said connecting through-opening(s) in order to be folded over around the boundary of the connecting through-opening(s) in the manner of a rivet. In this manner, a simple and secure connection can be achieved between the functional layer and the second layer.

To make this procedure easier, a corresponding opening of smaller diameter can be provided in the second layer, for instance as a bore. Alternatively, the second layer can be pierced and folded over at this point by a corresponding tool in a joint process. A corresponding depression can be provided in the functional layer for the folded-over part of the second layer, in which depression the folded-over portion is accommodated completely so that the functional layer is not thickened locally.

Of course, conventional connection types such as adhesive bonding, soldering, welding, riveting, screw-fastening and the like are alternatively or additionally possible to connect the layers securely.

DETAILED DESCRIPTION

Figure 1:
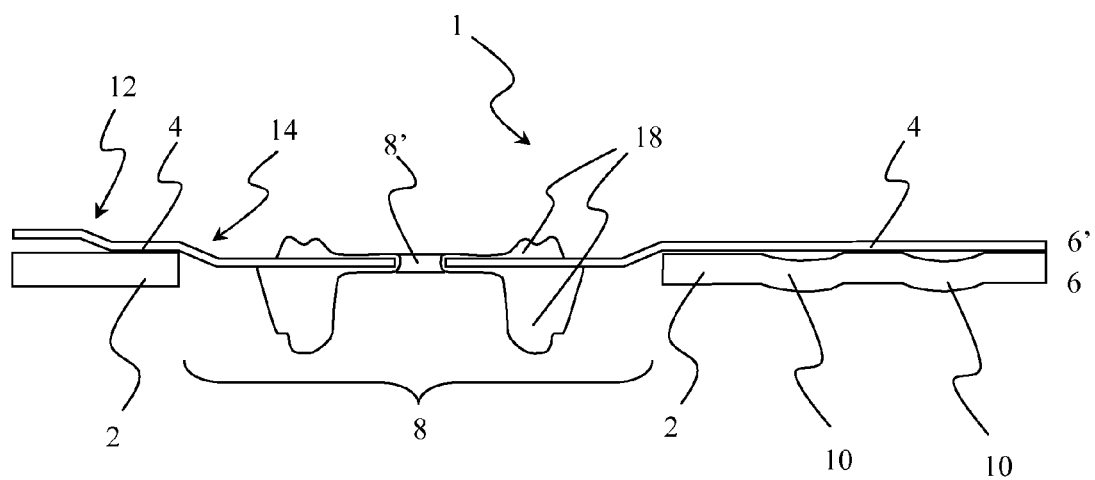
FIG. 1 shows a detail of an embodiment of a gasket according to the invention in cross section.

FIG. 1 is a cross-sectional view of a part of an embodiment of a flat gasket according to the invention. The outer boundary edge of the gasket is on the left-hand side in the figure, whereas a combustion chamber opening is on the right-hand side. A media through-opening is in the central region. The "anti-dirt or outer sealing" functional region is in the left-hand region, the "media sealing" functional region is in the central region, and the "gas or combustion chamber sealing" functional region is in the right-hand region.

The gasket 1 is formed by a relatively thick functional layer 2 and by a relatively thin, separate, second layer 4. According to the invention, the layer 4 is also referred to as protective layer. The functional layer 2 has at least one combustion chamber opening 6 (on the right here) and at least one media through-opening 8. The separate, second layer 4 has combustion chamber opening(s) 6' and media through-opening(s) 8' corresponding thereto. Of course, the whole gasket can also have a plurality of combustion chamber openings 6, 6' and/or a plurality of media through-openings 8, 8'. The respective openings in the different layers are not necessarily the same size, it being preferred for at least the combustion chamber openings to be substantially aligned.

The functional layer 2 has at least one sealing bead to seal off the combustion gases at the combustion chamber opening; in the embodiment shown here this is two full beads 10. Other numbers and shapes of beads, and a combination of different types of beads (half- and full beads) are likewise possible according to the invention, for instance a full bead combined with a half-bead. At least one of the beads can be a bead that runs around in a closed manner to ensure the sealing function at the combustion chamber. At least some of a second or generally further bead can however also run in an open manner. Additional beads can also have a stopper function for the at least one sealing bead.

As an alternative to the closed sealing bead, a variant having intersecting sections is also possible, for instance in the form of a labyrinth seal. This variant does not necessarily have to be "closed".

The separate, second or protective layer 4 has an outer boundary sealing bead 12, which is formed as a half-bead in the example shown. Alternatively, a full bead can be used instead, and in this case too combinations of at least one outer boundary sealing bead and where appropriate further beads, which do not necessarily have a purely sealing function, are of course also possible. These additional beads can also optionally act as stoppers for the outer boundary sealing bead.

In the variant of the gasket 1 shown, the functional layer 2 and the protective layer 4 have a substantially congruent outer boundary. Alternatively, it is also possible for the protective layer 4 to project outwards beyond the functional layer 2. This makes it possible to isolate the functional layer completely from the outside with the outer boundary sealing bead 12. For example, it is conceivable to provide an outer boundary sealing bead, which at least equalises the thickness of the functional layer 2, so that the functional layer 2 is sealed off from the outside when installed.

The protective layer 4 has injection-moulded elastomer sealing profiles 18, which perform the sealing of the media through-opening 8' (which is used for example for coolant or lubricant). In the embodiment of FIG. 1, the protective layer 2 has a media through-opening 8' that is much smaller than the corresponding media through-opening 8 in the functional layer. This creates the space to provide relatively wide elastomer sealing profiles 18. Since the protective layer 4 is relatively thin, the portion that projects further inwards can also spring well to compensate any lack of uniformity in height at the media through-openings 8'.

Alternatively, the media through-opening 8' can also be slightly smaller than or even the same size as the corresponding media through-opening 8. In the latter case, elastomer sealing profiles 18 are then suitable, the main part or sealing lips of which project inwards and only a small part is injection-moulded for fastening to the inner boundary of the media through-opening 8'.

In the embodiment of FIG. 1, the protective layer 4 also has a step 14, which is situated inside the media through-opening 8 in the functional layer 2. This makes it possible to align or arrange the centre planes of the functional layer 2 and protective layer 4 with respect to each other. In the example shown, the centre planes substantially align. Alternatively, other relative arrangements are also possible, as well as the use of a full bead instead of the step or half-bead 14.

Figure 2:
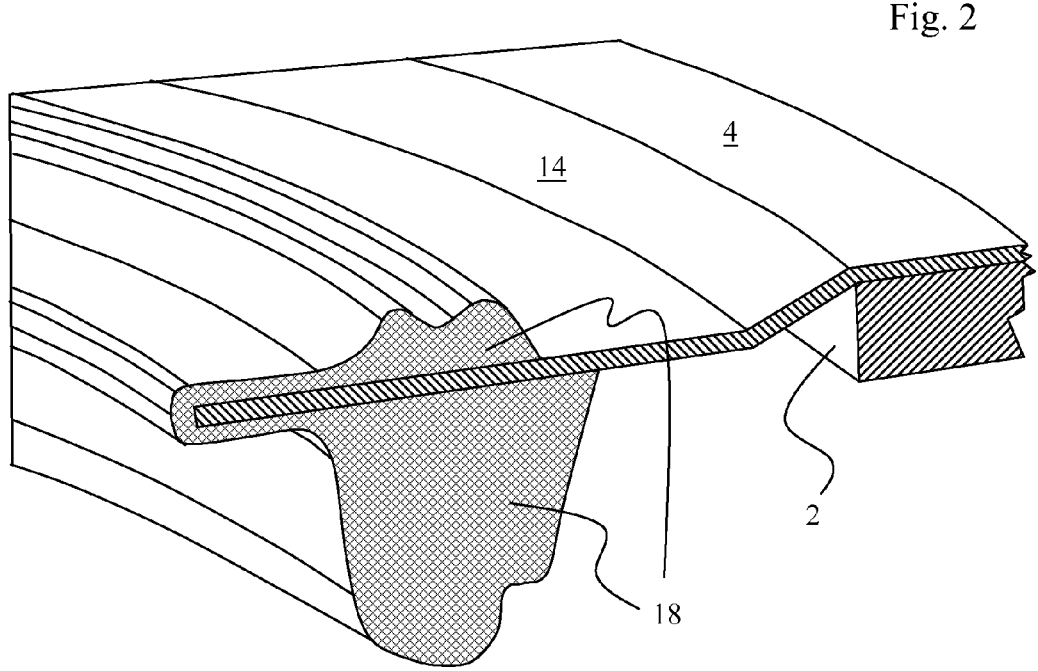
FIG. 2 shows a region of the embodiment of FIG. 1 in a three-dimensional sectional view.

FIG. 2 is a three-dimensional sectional view of the region of the media through-opening 8, 8' of the embodiment of FIG. 1. In the alternative shown here, the sealing faces of the elastomer sealing profiles 18 that are directed downwards and face the functional layer 2 are much thicker than the opposite sealing faces or sealing profiles that face away from the functional layer 2 and are directed upwards. The two sealing faces are connected by means of an integral elastomer bridge, which in this embodiment surrounds the inner boundary of the media through-opening 8' in a closed manner. In this embodiment, post-machining of the inner boundary of the media through-opening 8' can be omitted, for instance if the latter still has burrs or the like.

The step or half-bead 14 is likewise shown here. This is optional and does not necessarily have to be present in all embodiments of the invention.

Figure 3:
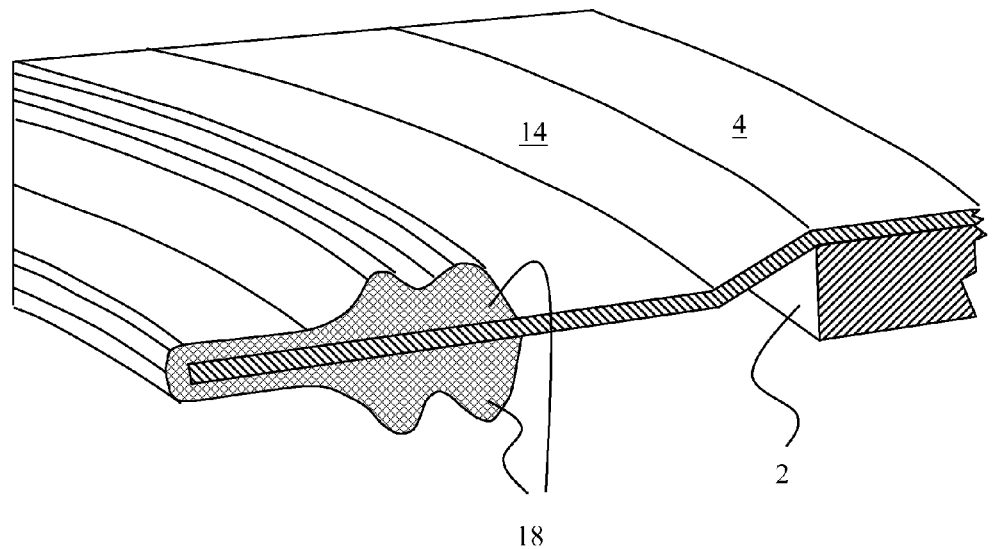
FIG. 3 shows a region of an alternative embodiment in a three-dimensional sectional view.

FIG. 3 shows an alternative embodiment to that of FIG. 2. In this case, the elastomer sealing profiles 18 are symmetrical, i.e. mirror-inverted with respect to the protective layer 2. In this case too, the two sealing faces are connected by means of an integral elastomer bridge.

Alternatively, it is also possible to provide separate sealing faces or elastomer sealing profiles 18 on each surface of the protective layer 2. In order nevertheless to achieve good connection of the elastomer sealing profiles 18, they can for instance be connected integrally through bores. With this embodiment it is possible to limit the injection-moulding to the two outer faces, which can simplify the production process, in particular with relatively small through-openings, with which injection-moulding around the inner boundary can be difficult.

Figure 4:
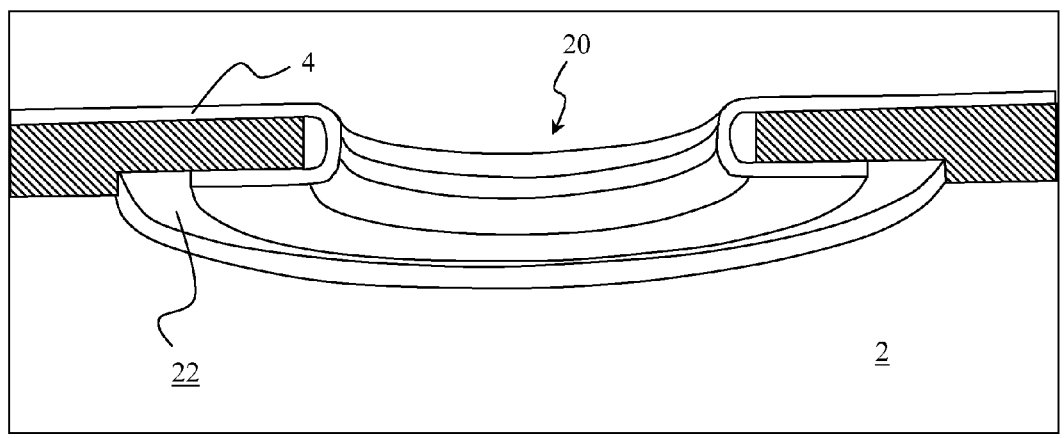
FIG. 4 shows a further region of an embodiment in a three-dimensional sectional view.

FIG. 4 shows a region of a fastening device of an embodiment of the invention in a three-dimensional sectional view. This variant can be used in addition to known connection methods (not shown), such as adhesive bonding, soldering, welding, riveting or screw-fastening. A connecting through-opening 20 is provided in the functional layer 2. In this connecting through-opening 20, the protective layer 4 is folded over around the functional layer 2. In the embodiment shown here, the functional layer 2 also has a depression 22, in which the folded-over part of the protective layer 4 is accommodated so that the thickness of the functional layer 2 is not changed. This type of connection means that no additional material is needed, and no time- and cost-intensive additional steps such as adhesive bonding, soldering, welding, riveting or screw-fastening are necessary.

Corresponding openings of smaller diameter can already be provided in the protective layer 4, for instance in the form of small bores. A tool can then be used to enlarge said opening in one step, the plate that is displaced in the process being folded over (where necessary with a second tool) around the boundary of the connecting through-opening 20 and into the depression 22 in a second step. It is however also possible to provide the bore in the protective layer 4 first shortly before the connection of the functional layer 2 and protective layer 4 in a preceding initial step.

The connecting openings 20 can optionally be designed in such a manner that they act at the same time as through-openings for connecting screws of the cylinder head and engine block. Alternatively, they can also be provided as separate openings from this.

Figure 5:
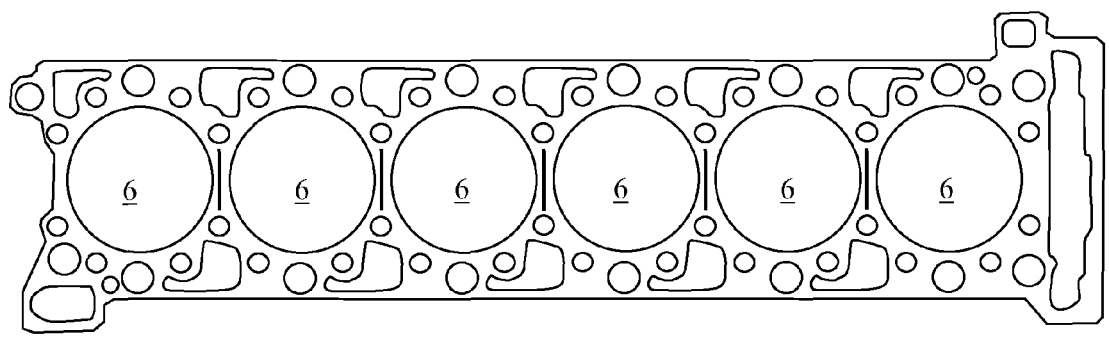
FIG. 5 shows a plan view of an embodiment of a gasket according to the invention.

FIG. 5 shows a gasket according to the invention (in this case by way of example for a six-cylinder engine) in a plan view.

The invention therefore offers inter alia the following advantages:

The integration of functions in one layer, namely macro sealing all the way round against dirt etc. with a (for example half-) bead and micro sealing for media and fluids by means of elastomer profiles;

The possibility of using only one known, existing spring steel layer;

The elimination of the use of at least two material qualities for insert/inserts and carriers compared with the use of individual inserts;

Improved handling, since only one layer is used for injection-moulding;

Elimination of a plurality of individual elements in the case of the use of individual inserts;

Lower assembly costs, since connection of many individual parts on one carrier layer is not necessary; and Elimination of the necessity of using an elastomer solution for the outer sealing and as a result cost advantages, since an additional elastomer material does not have to be used, and simpler injection-moulding dies can be used.

The invention claimed is:

1. A flat gasket, comprising:

a functional layer having at least one media through-opening and at least one combustion chamber through-opening; and a second layer, which is separate from said functional layer and has a corresponding at least one media through-opening that corresponds to said at least one media through-opening in said functional layer and a corresponding at least one combustion chamber through-opening that corresponds to said at least one combustion chamber through-opening in said functional layer; wherein said second layer includes a step which is disposed inside said at least one media through-opening in said functional layer in such manner as to align a main center plane of said functional layer parallel to surfaces to be sealed with a local center plane of said second layer inwardly of said step and also parallel to said main center plane;

wherein said functional layer has at least one combustion chamber sealing bead for each combustion chamber through-opening; and wherein said second layer has an elastomer sealing portion for each media through-opening, wherein the elastomer sealing portion extends on an upper and a lower sealing face of the second layer to define upper and lower sealing profile faces, respectively, and wherein said upper and lower sealing profile faces are connected by means of an integral elastomer bridge which surrounds an inner boundary of said associated media through-opening of said second layer in a closed manner; and wherein said second layer has a sealing bead in an outer boundary region thereof for each media through-opening; and said functional layer and said second layer lie one above the other in said outer boundary region; or wherein said second layer extends further outwards than said functional layer.

2. The flat gasket according to claim 1, wherein the functional layer and the second layer lie one above the other in the inner boundary region of the at least one combustion chamber opening.

3. The flat gasket according to claim 1, wherein the second layer projects radially inwards over the functional layer in the region of the at least one media through-opening.

4. The flat gasket according to claim 1, wherein the functional layer is a thicker layer than the second layer.

5. The flat gasket according to claim 1, wherein the second layer has a bead around at least one media through-opening, which points in the direction of the functional layer.

6. The flat gasket according to claim 1, wherein the functional layer has a thickness of 0.1-1.5 mm.

7. The flat gasket according to claim 1, wherein the functional layer is a galvanised steel layer.

8. The flat gasket according to claim 1, wherein the functional layer has at least two combustion chamber beads per combustion chamber opening.

9. The flat gasket according to claim 1, wherein said lower elastomer sealing profile face facing said functional layer is thicker than said upper elastomer sealing profile facing away from said functional layer.

10. The flat gasket according to claim 1, wherein the functional layer has at least one connecting through-opening and the second layer has at least one folded-over portion, which is folded over around the inner boundary of the connecting through-opening.

11. The flat gasket according to claim 1, wherein the flat gasket is a cylinder head gasket.

12. The flat gasket according to claim 1, wherein the thickness of the second layer is between 5% and 50% of the thickness of the functional layer.

13. The flat gasket according to claim 1, wherein said combustion chamber sealing bead comprises a full bead.

14. The flat gasket according to claim 1, wherein the functional layer has a thickness of about 0.9-1.1 mm.

15. The flat gasket according to claim 6, wherein the second layer has a thickness of 0.1-0.4 mm.

16. The flat gasket according to claim 6, wherein the second layer has a thickness of 0.1-0.3 mm.

17. The flat gasket according to claim 1, wherein the second layer has a thickness of 0.1-0.4 mm.

18. The flat gasket according to claim 7, wherein the second layer is a spring steel layer.

19. The flat gasket according to claim 1, wherein the second layer is a spring steel layer.

20. The flat gasket according to claim 1, wherein the thickness of the second layer is between 10 to 30% of the thickness of the functional layer.

21. The flat gasket according to claim 1, wherein the thickness of the second layer is approximately 20% of the functional layer.

22. A flat gasket, comprising:
a functional layer having at least one media through-opening and at least one combustion chamber through-opening;
a second layer, which is separate from said functional layer and has at least one media through-opening that corresponds to said at least one media through-opening in said functional layer and at least one combustion chamber through-opening that corresponds to said at least one combustion chamber through-opening in said functional layer wherein said second layer includes a step which is disposed inside said at least one media through-opening in said functional layer in such manner as to align a local center plane of said second layer inwardly of said step with a main center plane of said functional layer parallel to surfaces to be sealed; and
wherein said second layer has an elastomer sealing profile for each media through-opening, wherein the elastomer sealing profile forms upper and a lower sealing faces on opposite sides of said second layer and wherein said upper and lower sealing faces are connected by an integral elastomer bridge, which surrounds an inner boundary of said at least one media through-opening of said second layer in a closed manner.

23. The flat gasket according to claim 22 wherein said at least one media through-opening in said second layer is smaller than said at least one media through-opening in said functional layer, with space being provided between said at least one media through-opening in said second layer and said at least one media through-opening in said functional layer to accommodate said elastomer sealing profile.

24. The flat gasket according to claim 10 wherein said functional layer includes a depression extending around the inner boundary of said connecting through-opening and said at least one folded-over portion of said second layer extends into said depression to provide an unchanged thickness of said functional layer.

* * * * *